US009498013B2

(12) United States Patent
Handshaw et al.

(10) Patent No.: US 9,498,013 B2
(45) Date of Patent: Nov. 22, 2016

(54) WEARABLE SAFETY APPARATUS FOR, AND METHOD OF, DISPLAYING HEAT SOURCE CHARACTERISTICS AND/OR HAZARDS

(71) Applicant: MOTOROLA SOLUTIONS, INC, Schaumburg, IL (US)

(72) Inventors: Darran Michael Handshaw, Sound Beach, NY (US); John E. Buchalo, S Barrington, IL (US); Mark A. Krizik, Homer Glen, IL (US); Joseph C. Namm, Plantation, FL (US); Karthik Lakshminarayanan, Wilmington, DE (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 189 days.

(21) Appl. No.: 14/491,281

(22) Filed: Sep. 19, 2014

(65) Prior Publication Data

US 2016/0081415 A1 Mar. 24, 2016

(51) Int. Cl.

| | |
|---|---|
| ***G08B 17/12*** | (2006.01) |
| ***A42B 3/04*** | (2006.01) |
| ***G01J 5/00*** | (2006.01) |
| ***G01J 5/32*** | (2006.01) |
| ***G01J 5/02*** | (2006.01) |
| ***G01J 5/04*** | (2006.01) |
| *G01J 5/28* | (2006.01) |
| *G08B 1/00* | (2006.01) |
| *G02B 1/00* | (2006.01) |

(52) U.S. Cl.

CPC .............. *A42B 3/046* (2013.01); *G01J 5/0018* (2013.01); *G01J 5/025* (2013.01); *G01J 5/04* (2013.01); *G01J 5/32* (2013.01); *G01J 2005/0077* (2013.01); *G01J 2005/283* (2013.01); *G02B 1/00* (2013.01); *G08B 1/00* (2013.01)

(58) Field of Classification Search

CPC .................................. G08B 1/00; G02B 1/00

See application file for complete search history.

(56) References Cited

U.S. PATENT DOCUMENTS

| | | | | |
|---|---|---|---|---|
| 5,864,481 | A | 1/1999 | Gross et al. | |
| 6,456,261 | B1 | 9/2002 | Zhang | |
| 6,934,633 | B1 | 8/2005 | Gallagher et al. | |
| 7,202,815 | B2 | 4/2007 | Swope et al. | |
| 2001/0037519 | A1* | 11/2001 | Paris | A41D 13/11 2/422 |
| 2003/0210228 | A1 | 11/2003 | Ebersole | |
| 2006/0048286 | A1 | 3/2006 | Donato | |
| 2006/0289762 | A1* | 12/2006 | Hackney | A62C 99/009 250/338.1 |
| 2007/0087311 | A1 | 4/2007 | Garvey et al. | |
| 2007/0205903 | A1 | 9/2007 | diMarzo et al. | |
| 2007/0235648 | A1* | 10/2007 | Teich | G08B 13/19641 250/330 |

(Continued)

*Primary Examiner* — Shirley Lu

(57) ABSTRACT

A wearable safety apparatus includes a housing, a plurality of directional thermal imaging sensors mounted on the housing and facing outwardly away from the housing in a corresponding plurality of different directions towards thermal zones of a heat source. Each sensor detects infrared radiation (IR) intensity and generates an output indicative of a temperature of the detected IR intensity in a respective thermal zone faced by a respective sensor. An interface is mounted on the housing and has a display positioned to be viewable by a user, e.g., a firefighter. A controller processes the outputs generated by the sensors, and displays at a plurality of spaced-apart positions on the display a plurality of positional thermal indicators when the temperature in the respective thermal zone is elevated. The position of each positional thermal indicator corresponds to the thermal zone faced by the respective sensor.

12 Claims, 8 Drawing Sheets

18
10
16
28
30

(56) References Cited

U.S. PATENT DOCUMENTS

2009/0184244 A1* 7/2009 Drews ..................... A62B 3/00 250/330
2012/0191397 A1* 7/2012 Eatwell .................... A61B 5/11 702/94
2013/0290909 A1* 10/2013 Gray ...................... G01C 21/00 715/854

* cited by examiner

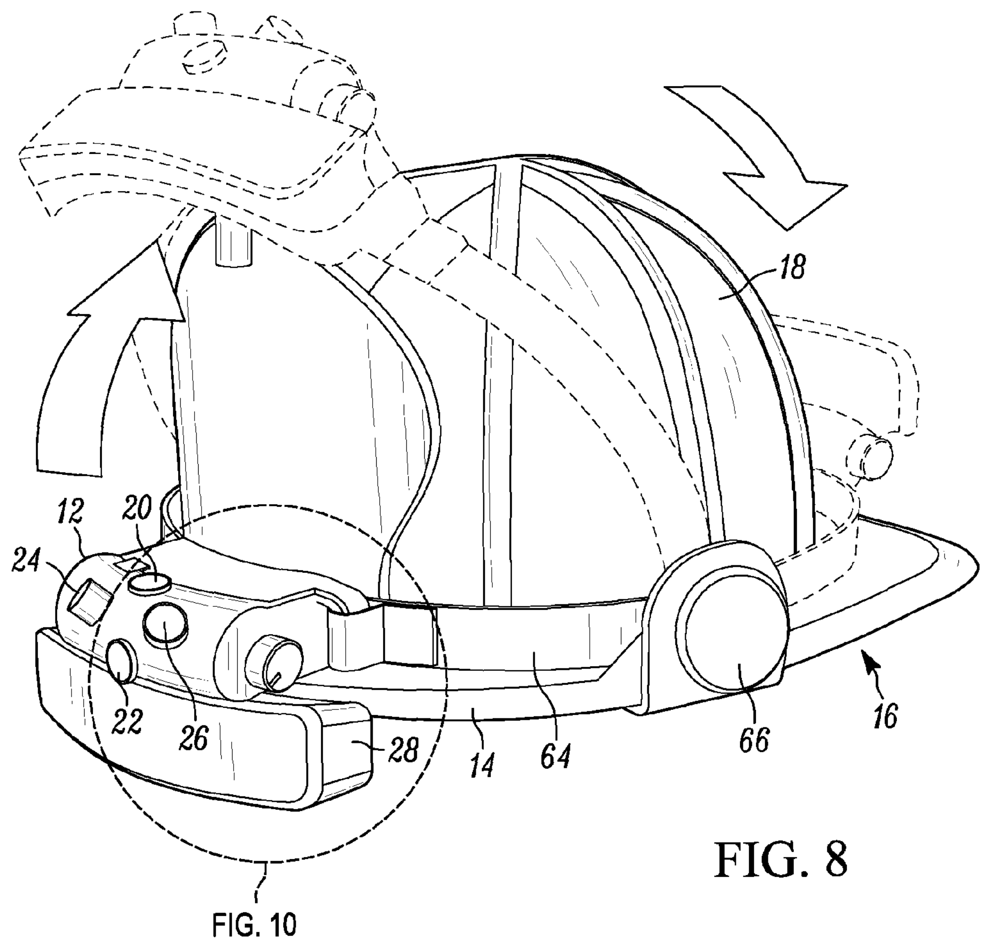
FIG. 8
FIG. 9
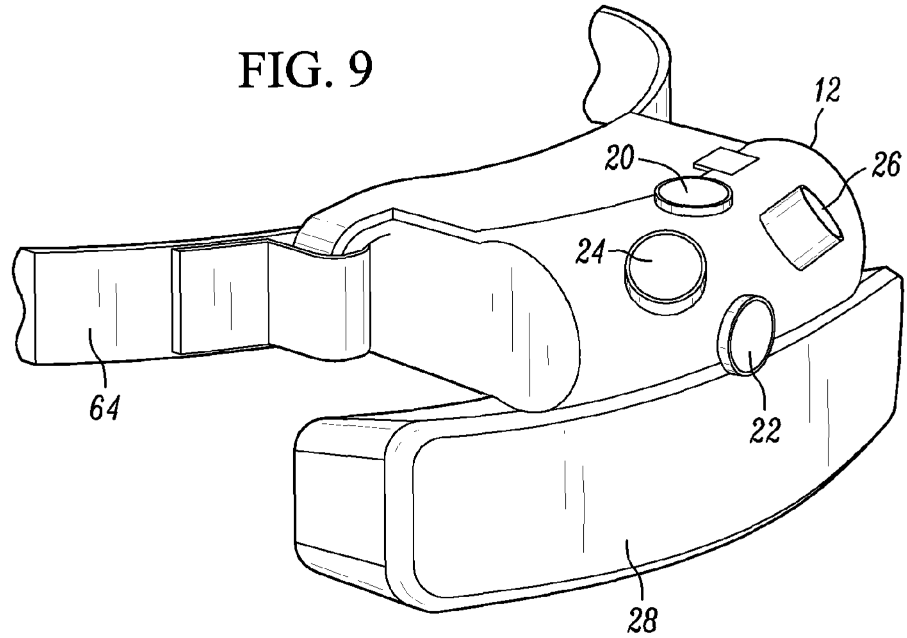

WEARABLE SAFETY APPARATUS FOR, AND METHOD OF, DISPLAYING HEAT SOURCE CHARACTERISTICS AND/OR HAZARDS

FIELD OF THE DISCLOSURE

The present disclosure relates generally to a wearable safety apparatus for, and a method of, displaying heat source characteristics, such as the direction and intensity of thermal zones of a fire, and/or hazard warnings, such as conditions leading to a flashover or smoke explosion, to a wearer or user, such as a firefighter, who is wearing the apparatus in a hands-free manner while fighting the fire, and who is viewing such displayed characteristics and/or warnings on an interface that is readily, rapidly and efficiently comprehensible without distraction or obstruction of the firefighter's vision.

BACKGROUND

A firefighter typically faces a variety of challenges hindering the firefighter's ability to locate and extinguish a fire. In modern day, interior structure firefighting, the prevalence of synthetic materials in both residential dwellings and commercial occupancies causes fires to burn hotter and faster, to emit thick, black, and often poisonous, smoke that usually obstructs the firefighter's vision, to emit flammable, poisonous gases such as carbon monoxide and hydrogen cyanide, and to generate loud ambient noise or "fireground wind" that usually impedes the firefighter's hearing. The thick, black smoke typically builds up at ceiling level and banks down to the floor, thereby creating a substantially zero-visibility environment. Heavy protective firefighting equipment or bunker gear, such as self-contained breathing apparatus (SCBA), often dulls the firefighter's normal human senses, thereby sometimes causing the firefighter to be less alert to developing hazards, such as "flashover", which occurs in a compartment fire when the total thermal radiation is sufficiently high such that flammable products of pyrolysis are generated from all exposed combustible surfaces within the compartment. Each flammable gas in the compartment has a flash point, and each flammable gas-air mixture in the compartment ignites at its own auto-ignition temperature when a flame or spark is not present. Once the lowest auto-ignition temperature is reached for a first gas-air mixture, a laddering effect occurs in which the ignition of the first gas-air mixture raises the temperature in the compartment, thereby causing a second gas-air mixture to ignite when its auto-ignition temperature has been reached. The result is a sudden, cascaded, frequently explosive, and sustained, transition from a growing fire to a fully developed fire. Flashover is often fatal to a firefighter remaining in the compartment even for short periods of time. It is, therefore, important for a firefighter to know when temperatures and/or gases in his/her vicinity are approaching conditions leading to a flashover so that the firefighter may take appropriate action, including moving away from the flashover vicinity to a safer location, or cooling the flashover vicinity with water from a hose.

A related hazard is "smoke explosion" in which the temperature reaches a level sufficient to ignite ambient smoke particles, thereby forming an explosive, and usually fatal, fireball. Obstacles, such as furniture, concealed by ambient thick, black smoke, may physically impede the firefighter's progress and cause the firefighter to lose his/her sense of direction, which hampers the firefighter's search for, and extinguishing of, the source of the fire. To avoid such smoke, obstacles, gases, and heat, especially in a zero-visibility environment, firefighters must often crawl upon the floor, thereby making the locating, and the extinguishing, of the source of the fire yet even more difficult and slower.

Stand-alone, handheld thermal imaging cameras are currently used by firefighters to locate the direction and intensity of thermal zones of a fire, and stand-alone, handheld gas detection meters are also currently used to detect flammable gases. As advantageous as such cameras/meters have been as firefighting accessories, the cameras have relatively narrow fields of view, and such cameras/meters are relatively expensive to purchase. Typically, there is only one such camera/meter allocated to each fire truck, and, hence, only one firefighter from the truck, as a practical matter, will benefit from their use. The existing cameras/meters are hand-operated, thereby occupying at least one, if not both, of the firefighter's hands, which might otherwise be more useful in handling other crucial firefighting tools. It is customary for one of the firefighter's hands to be occupied by following a hand lead on a search through a burning structure.

Accordingly, there is a need to display the direction and intensity of thermal zones of a fire, and/or to display hazard warnings, such as conditions leading to a flashover or smoke explosion, to a firefighter on an interface that is readily, rapidly and efficiently comprehensible without distraction or obstruction of the firefighter's vision, and without occupying the firefighter's hands, and whose cost is relatively inexpensive such that a fire department can readily equip each firefighter with his/her own wearable safety apparatus employing said interface, thereby safeguarding all their firefighters' lives and health.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 8 is a front and side, perspective view of another embodiment of a wearable safety apparatus mounted on a firefighter's helmet in accordance with the present disclosure.

FIG. 9 is a broken-away, front perspective view of the embodiment of the wearable safety apparatus of FIG. 8 in isolation.

Figure 1:
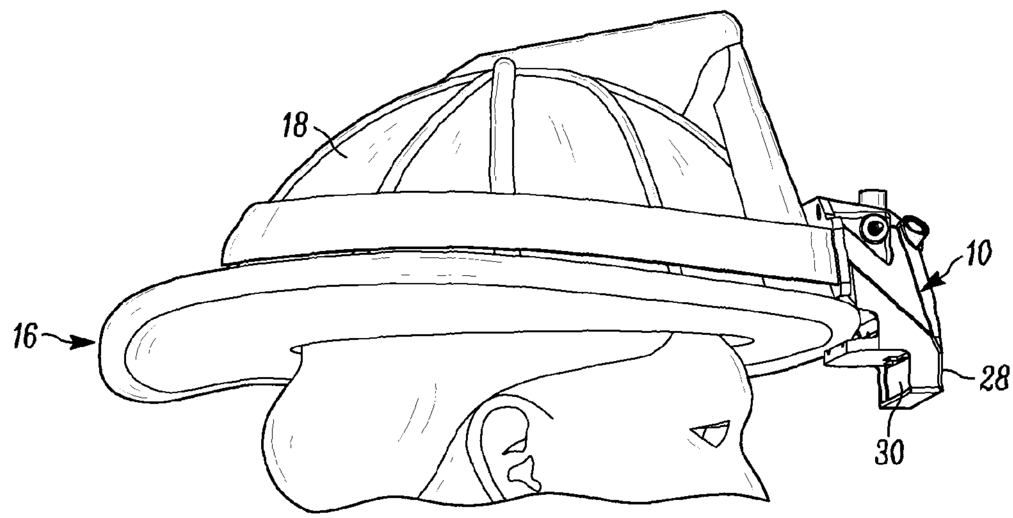
FIG. 1 is a side perspective view of one embodiment of a wearable safety apparatus mounted on a firefighter's helmet in accordance with the present disclosure.
Figure 2:
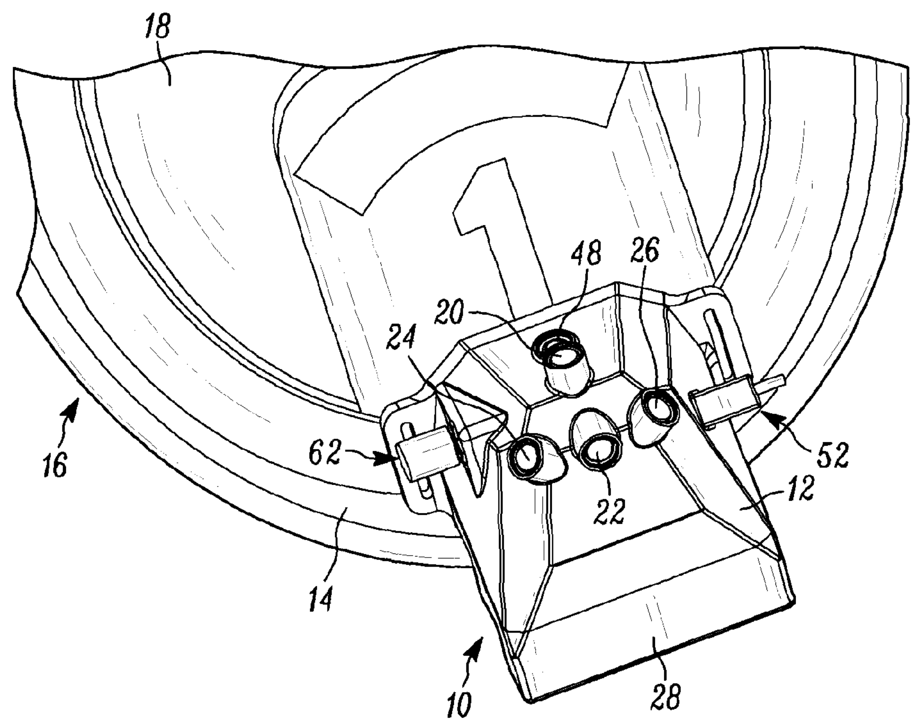
FIG. 2 is a broken-away, top and front, perspective view of the wearable safety apparatus of FIG. 1 on an enlarged scale.
Figure 3:
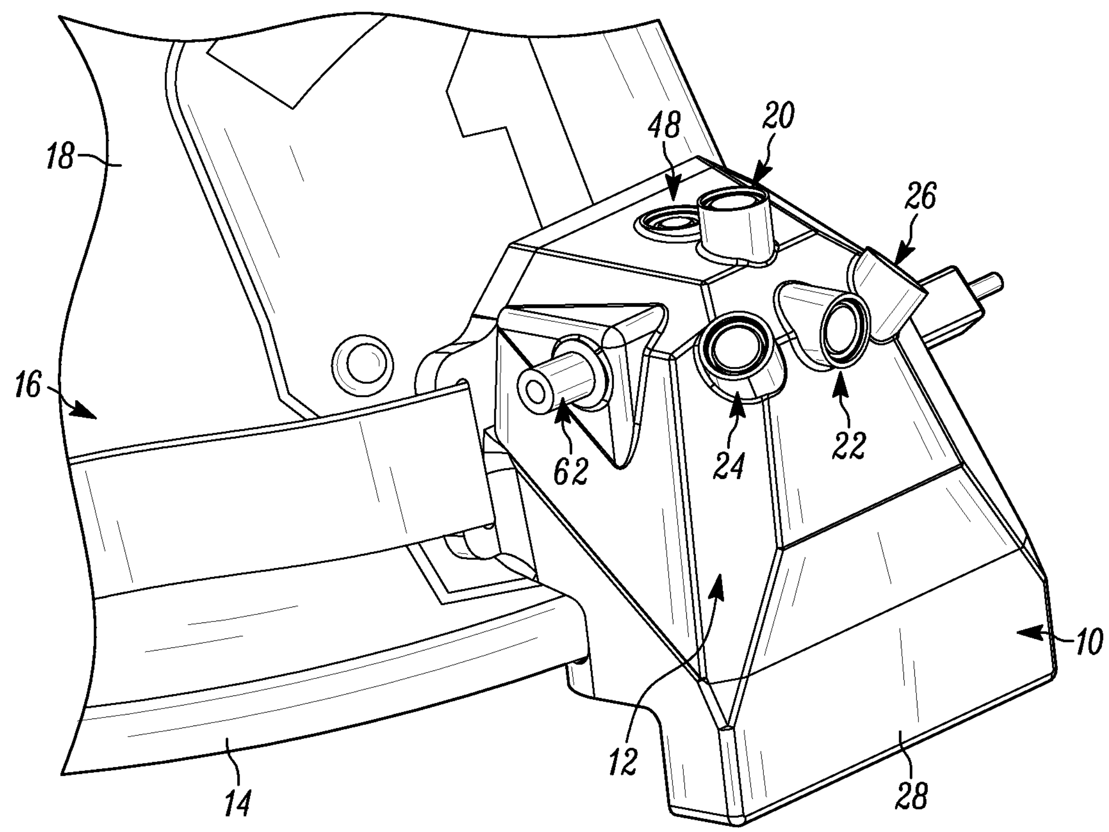
FIG. 3 is a broken-away, side, perspective view of the wearable safety apparatus of FIG. 1 on an enlarged scale.
Figure 4:
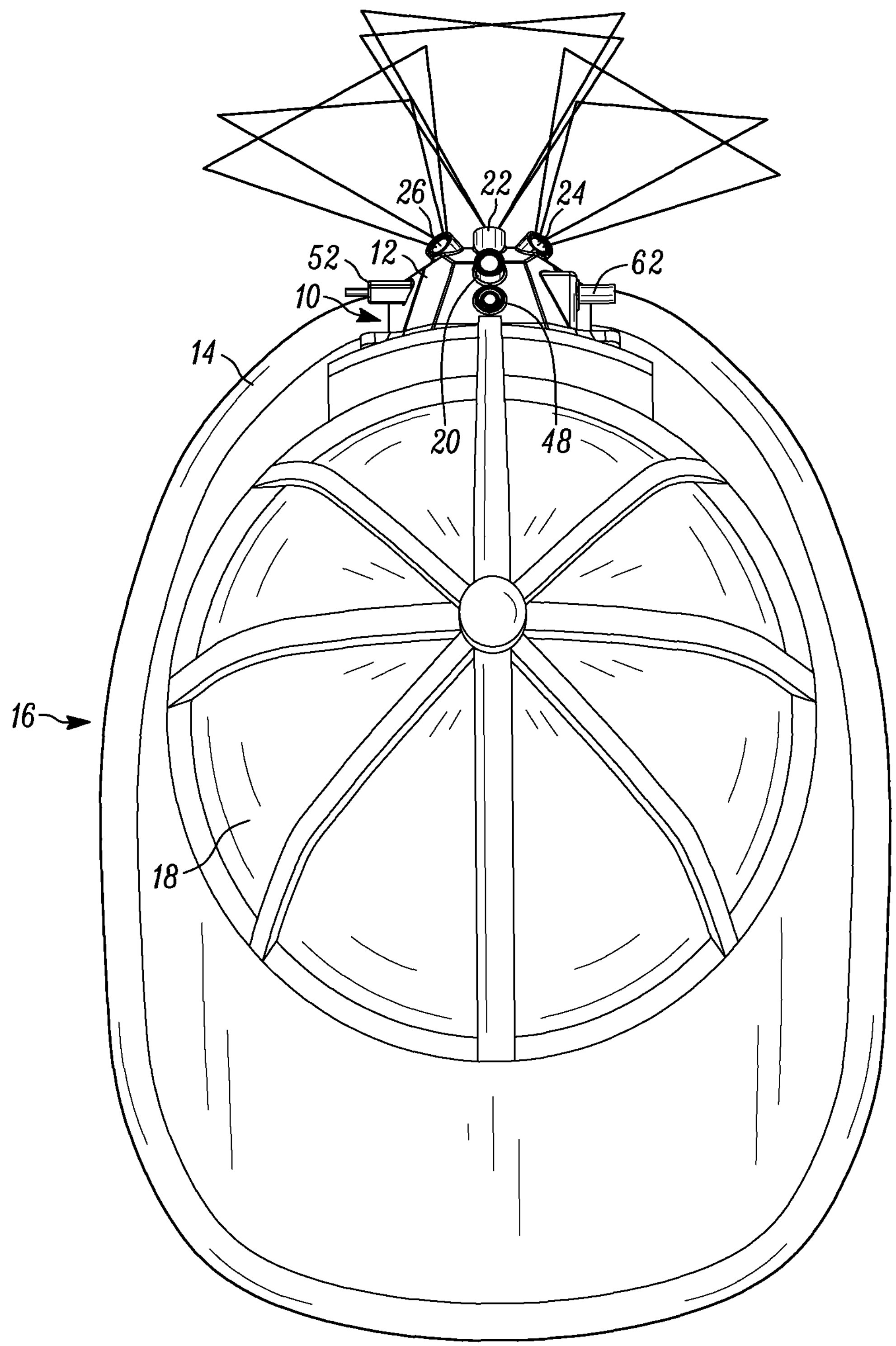
FIG. 4 is a diagrammatic, top plan view of the wearable safety apparatus of FIG. 1 depicting overlapping wide fields of view of thermal sensors mounted on the safety apparatus.

Skilled artisans and practitioners will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a wearable safety apparatus, of particular benefit in firefighting applications. The apparatus includes a housing worn by a user. For example, the housing may be mounted on a front brim of a firefighter's helmet. A plurality of directional thermal imaging sensors or cameras is mounted on the housing and generally face outwardly away from the housing in a corresponding plurality of different directions towards thermal zones of a heat source or fire. Each sensor is operative for detecting infrared radiation (IR) intensity and for generating an output indicative of a temperature of the detected IR intensity in a respective thermal zone generally faced by a respective sensor. An interface is also mounted on the housing and has a display positioned to be viewable by the user. For example, the display may be situated below the front brim of the helmet and above the firefighter's eyes. A controller processes the outputs generated by the sensors, and displays at a plurality of spaced-apart positions on the display a plurality of positional thermal indicators when the temperature in the respective thermal zone is elevated. The position of each positional thermal indicator corresponds to the respective thermal zone generally faced by the respective sensor. Thus, the firefighter knows at a glance the direction of any hot thermal zone having an elevated temperature, as well as any cool thermal zone having a relatively cooler temperature.

Advantageously, an accelerometer is mounted in the housing for detecting when the housing is in an upright orientation, e.g., when the firefighter is standing upright with his/her head upright, or when the housing is in a tilted orientation, e.g., when the firefighter is crawling with his/her head tilted. The sensors include a top sensor facing generally upwardly in the upright orientation, a forward sensor facing generally forwardly in the upright orientation, a right peripheral sensor facing generally rightwardly, upwardly, and forwardly in the upright orientation, and a left peripheral sensor facing generally leftwardly, upwardly, and forwardly in the upright orientation. The indicators include a top positional thermal indicator at an upper part of the display for indicating the IR intensity at an overhead thermal zone generally faced by the top sensor in the upright orientation, a forward positional thermal indicator at a central part of the display for indicating the IR intensity at a forward thermal zone generally faced by the forward sensor in the upright orientation, a right positional thermal indicator at a right part of the display for indicating the IR intensity at a right thermal zone generally faced by the right peripheral sensor, and a left positional thermal indicator at a left part of the display for indicating the IR intensity at a left thermal zone generally faced by the left peripheral sensor. The controller illuminates the corresponding indicator to indicate the corresponding IR intensity or elevated temperature at the corresponding thermal zone. In the tilted orientation, the top sensor faces generally forwardly, and the forward sensor faces generally downwardly.

The forward positional thermal indicator includes a horizontal row of multiple indicator elements. The forward indicator is either the forward sensor in the upright orientation, or the top sensor in the tilted orientation. The field of view of either the forward sensor or the top sensor is subdivided into multiple subfields, each subfield corresponding to an indicator element for increased resolution. The controller illuminates a subset of the indicator elements in a directional pattern to indicate the spatial variation of the IR intensity across the forward thermal zone. The subset of the indicator elements may also be colored to indicate the level of the temperature across the forward thermal zone. For example, the colors may be blue, green, yellow, orange, or red to respectively indicate higher levels of temperature in that order.

The apparatus advantageously also includes an ambient thermal imaging sensor or camera mounted on the housing to detect the ambient temperature in the vicinity of the apparatus, and a gas detector mounted on the housing to detect gases, such as oxygen, air, carbon monoxide, hydrogen cyanide, and like flammable gases, as well as the concentration of such gases. The controller is operative for displaying on the display a maximum elevated temperature detected by any of the sensors, preferably in numerals, and a hazard warning or indicator indicative of lack of air, or the presence and concentration of a flammable gas. The controller processes the ambient temperature, the outputs from all the thermal sensors, and the gases and concentrations detected by the gas detector to determine the likelihood of conditions leading to a flashover, and indicates such flashover conditions by, for example, flashing all the indicators upon such a determination.

Another aspect of this disclosure relates to a safety method performed by the steps of wearing a housing in a hands-free manner; mounting a plurality of directional thermal imaging sensors on the housing; generally facing the sensors outwardly away from the housing in a corresponding plurality of different directions towards thermal zones of a heat source, each sensor being operative for detecting infrared radiation (IR) intensity and for generating an output indicative of a temperature of the detected IR intensity in a respective thermal zone generally faced by a respective sensor; mounting an interface on the housing with a display positioned to be viewable by a user; processing the outputs generated by the sensors; and displaying at a plurality of spaced-apart positions on the display a plurality of positional thermal indicators when the temperature in the respective thermal zone is elevated, the position of each positional thermal indicator corresponding to the thermal zone generally faced by the respective sensor. Advantageously, the housing is worn on a helmet mounted on the user's head, and the user turns his/her head to locate the direction of the heat source.

Turning now to the drawings, reference numeral 10 in FIGS. 1-6 depicts a wearable safety apparatus, of particular benefit in firefighting applications. The apparatus 10 includes a housing 12 worn by a user and, as shown, a firefighter. For example, the housing 12 is illustrated as being mounted on a front brim 14 of a firefighter's helmet 16 having a crown 18. It will be understood as the description continues that the housing 12 need not be mounted on the helmet brim 14, but could be mounted elsewhere, for example, at another location on the helmet 16, or on a mask of a self-contained breathing apparatus (SCBA), or on a regulator of the SCBA, or on an eye or face shield, or on eyeglasses, etc. Thus, the apparatus 10 is worn by the firefighter, that is, it is supported by the firefighter in a hands-free manner, thereby freeing the firefighter's hands for other tasks.

A plurality of directional thermal imaging sensors 20, 22, 24 and 26 or cameras is mounted on the housing 12 and generally face outwardly away from the housing 12 in a corresponding plurality of different directions towards thermal zones of a heat source or fire. The sensors include a top sensor 20 facing generally upwardly, a forward sensor 22 facing generally forwardly, a right peripheral sensor 24 facing generally rightwardly, upwardly, and forwardly, and a left peripheral sensor 26 facing generally leftwardly, upwardly, and forwardly. Each sensor 20, 22, 24 and 26 is operative for detecting infrared radiation (IR) intensity, and for generating an output indicative of a temperature of the detected IR intensity in a respective thermal zone generally faced by a respective sensor. Thus, in the orientation shown in FIG. 1 where the firefighter is standing upright with the helmet 16 resting atop his head, the top sensor 20 is looking generally vertically upwardly at an overhead thermal zone directly above the firefighter; the forward sensor 22 is looking generally horizontally at a forward thermal zone directly ahead of the firefighter; the right peripheral sensor 24 is looking generally rightwardly, forwardly, and upwardly at a right peripheral thermal zone to the right flank of the firefighter; and the left peripheral sensor 26 is looking generally leftwardly, forwardly, and upwardly at a left peripheral thermal zone to the left flank of the firefighter.

Each sensor 20, 22, 24 and 26 is a two-dimensional array of thermal detectors, e.g., a 4×16 array, and has a relatively wide imaging field of view, e.g., 60 degrees×20 degrees along two mutually orthogonal directions. This contrasts with the above-described narrow field of view of the known prior art cameras. As best diagrammatically shown in FIG. 4, these fields of view overlap at a predetermined distance away from the apparatus 10. For example, beyond about one meter away from the housing 12, the overlapping wide fields of view provide a continuous coverage zone or wide forward cone that is centered along the firefighter's line of sight. As the firefighter moves and turns and/or rolls his/her head in any direction, this wide forward cone jointly moves with his/her head, thereby insuring that no heat source or thermal zone will fail to be detected. The wide forward cone is thus efficiently swept for any thermal signatures since there are no dead zones therein.

Figure 5:
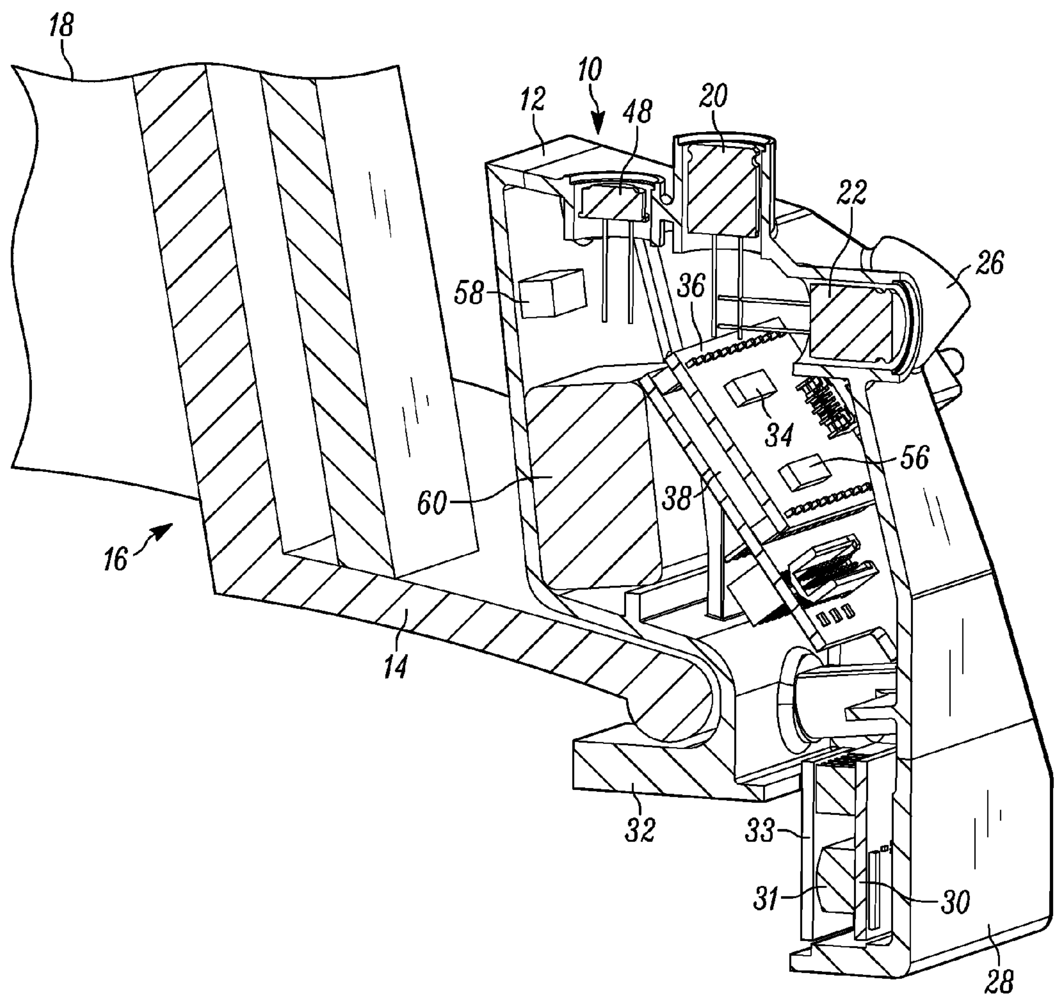
FIG. 5 is a side, sectional view of the wearable safety apparatus of FIG. 1 on an enlarged scale.
Figure 6:
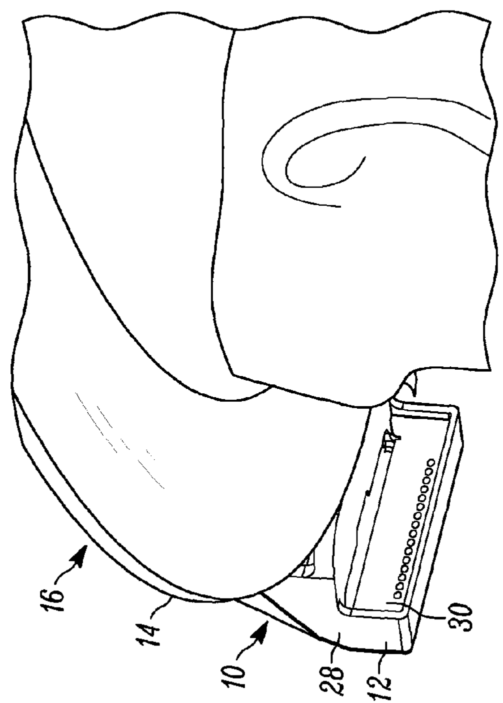
FIG. 6 is a broken-away, rear perspective view of the wearable safety apparatus of FIG. 1.

An interface 28 is also mounted on the housing 12 and has a display 30 or screen positioned to be viewable by the user. For example, the display 30 may be situated below the front brim 14 of the helmet 16 and above the firefighter's eyes. As best shown in FIG. 5, the housing has a bottom bracket 32 for engaging a lower surface of the brim 14. A focusing lens 31 is preferably mounted in front of the display 30 to help bring the display into focus in the firefighter's vision. A protective, light-transmissive cover 33 overlies the lens 31 and the display 30. As shown in FIG. 6, the display 30 does not obstruct the firefighter's direct line of sight. The display is focused and readily viewable by having the firefighter shift his gaze slightly upward.

A controller 34 or microprocessor (see FIG. 5) is mounted on a printed circuit board 36 inside the housing 12. The controller 34 processes the outputs generated by the sensors 20, 22, 24 and 26, and displays a plurality of positional thermal indicators 40, 42, 44 and 46 (see FIG. 7) on the display 30 when the temperature in the respective thermal zone is elevated, i.e., exceeds a predetermined threshold or level. The positional indicators 40, 42, 44 and 46 may be light-emitting diodes energized by the controller 34, or may be pixels illuminated by the controller 34. Thus, the controller 34 will illuminate the indicator 40 when the top sensor 20 detects an elevated temperature, and will illuminate the indicator 42 when the forward sensor 22 detects an elevated temperature, and will illuminate the indicator 44 when the right sensor 24 detects an elevated temperature, and will illuminate the indicator 46 when the left sensor 26 detects an elevated temperature.

The positional indicators 40, 42, 44 and 46 are arranged at a plurality of spaced-apart positions on the display 30. The position of each positional indicator corresponds to the respective thermal zone generally faced by the respective sensor 20, 22, 24 and 26. Thus, indicator 40 is a top indicator positioned at an upper or top part of the display 30 for indicating the IR intensity at the overhead thermal zone generally faced by the top sensor 20; indicator 42 is a forward indicator positioned at a lower central part of the display 30 for indicating the IR intensity at the forward thermal zone generally faced by the forward sensor 22; indicator 44 is a right indicator positioned at a right part or end of the display 30 for indicating the IR intensity at the right thermal zone generally faced by the right peripheral sensor 24; and indicator 46 is a left indicator positioned at a left part or end of the display 30 for indicating the IR intensity at the left thermal zone generally faced by the left peripheral sensor 26. Thus, the firefighter knows at a glance the direction of any hot thermal zone having an elevated temperature, as well as any cool thermal zone having a relatively cooler temperature.

Figure 7:
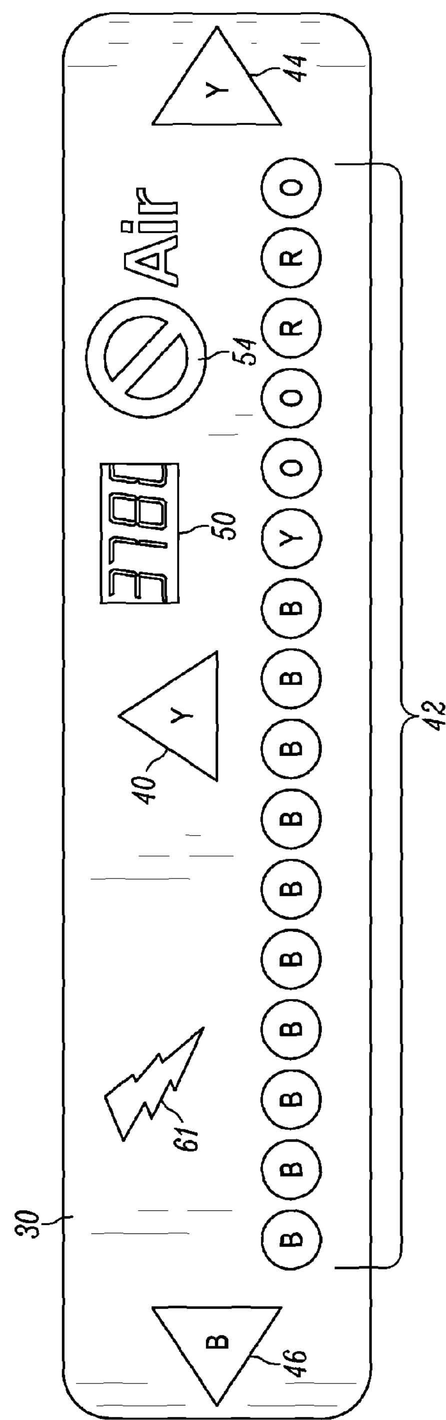
FIG. 7 is a plan view of an interface on the wearable safety apparatus of FIG. 1 on an enlarged scale.

The indicators 40, 44, and 46 are shown as triangles in FIG. 7, although other shapes, such as arrows or spots, may be employed. The forward indicator 42 includes a horizontal row of multiple indicator elements or circular spots. The controller 34 processes the outputs from the thermal sensors 20, 22, 24, and 26, and illuminates a subset of the indicator elements in a directional pattern to indicate the spatial variation of the IR intensity across the forward thermal zone. The subset of the indicator elements may also be colored to indicate the level of the temperature across the forward thermal zone. For example, the colors may be blue (B), green (G), yellow (Y), orange (O), or red (R) to respectively indicate higher levels of temperature in that order.

As shown in FIG. 7, the indicator 42 has sixteen elements, each element corresponding to a different subfield of the field of view of the forward sensor 22. Going from left to right, the first ten elements of the indicator 42 are colored blue, thereby indicating that the temperature at the left flank of the firefighter is relatively cool. The next element of the indicator 42 is colored yellow, the next two elements of the indicator 42 are colored orange, the next two elements of the indicator 42 are colored red, and the last one of the indicator 42 is colored orange, thereby indicating that the temperature at the right, forward flank of the firefighter is relatively hot. At the same time, the left indicator 46 is colored blue, and the top indicator 40 and the right indicator 44 are colored yellow, again confirming that the fire is somewhere to the right, forwardly, and above the firefighter. By way of non-limiting numerical example, an individual element may be colored blue when its subfield has a temperature of below about 100 degrees Fahrenheit, may be colored green when its subfield has a temperature in a range of about 100 degrees Fahrenheit to about 130 degrees Fahrenheit, may be colored yellow when its subfield has a temperature in a range of about 130 degrees Fahrenheit to about 200 degrees Fahrenheit, may be colored orange when its subfield has a temperature in a range of about 200 degrees Fahrenheit to about 350 degrees Fahrenheit, and may be colored red when its subfield has a temperature above about 350 degrees Fahrenheit. Thus, the firefighter knows at a glance at the display 30 the direction and intensity of any thermal zone having an elevated temperature. The firefighter also knows that a relatively safe egress can be made by advancing to the left, i.e., where the elements of the indicator 42 are colored blue.

As also shown in FIG. 5, an accelerometer 38 or tilt sensor is mounted in the housing 12 for detecting when the housing 12 is in an upright orientation, e.g., when the firefighter is standing upright with his/her head and/or helmet upright (as depicted in FIG. 1), or when the housing 12 is in a tilted orientation, e.g., when the firefighter is crawling with his/her head and/or helmet tilted. In the tilted orientation, the top sensor 20 faces generally forwardly, and the forward sensor 22 faces generally downwardly. The controller 34 knows when the tilted orientation has been detected by the accelerometer 38, and the forward indicator 42 is now illuminated based on the output from the top sensor 20, rather than from the forward sensor 22. The firefighter can continue to sweep and scan the environment even when crawling.

The apparatus 10 also includes an ambient thermal imaging sensor 48, typically a metal element, to detect the ambient temperature in the vicinity of the apparatus, and the controller 34 is operative for displaying on the display 30 the highest temperature, including the ambient temperature, preferably in numerals, determined by any of the thermal sensors, at a temperature indicator 50 (see FIG. 7). The apparatus 10 also includes a gas detector 52 (see FIG. 2) mounted on the housing for detecting each gas, e.g., oxygen, air, or a flammable gas, such as carbon monoxide or hydrogen cyanide, in the vicinity of the apparatus, as well as the concentration of such gases, and the controller 34 is operative for displaying on the display 30 a hazard warning or indicator 54 indicative of little or no oxygen. The indicator 54 may be symbolic as shown, or may be numerical, e.g., expressed in parts per million (PPM), preferably at the location of the indicator 50 when there is no heat. The controller 34 processes the ambient temperature, the outputs from all the thermal sensors, and the gases and their concentration detected by the gas detector 52 to determine the likelihood of conditions leading to a flashover, and indicates such flashover conditions by, for example, flashing all the indicators, and/or activating an internal buzzer, upon such a determination.

More particularly, the gas detector 52 identifies each gas and its concentration and, together with the controller 34, determines whether the temperature is approaching the flash point for each gas, as well as whether the temperature is approaching the auto-ignition temperature for each gas-air mixture. The controller 34 determines whether the lowest flash point and the lowest auto-ignition temperature for one of the detected gases have been approached, and then indicates that conditions leading to a flashover are present, and that corrective action needs to be taken before the above-mentioned laddering effect occurs. By way of non-limiting numerical example, such flashover conditions may be indicated when the ambient temperature exceeds 150 degrees Centigrade, when any indicator, particularly the overhead indicator 40, is colored red, and when the gas and the gas concentration is relatively high, e.g., over 800 PPM in the case of carbon monoxide, and when the temperature approaches the flash point of the carbon monoxide, e.g., about 312 degrees Fahrenheit, and when the temperature approaches the auto-ignition temperature of the carbon monoxide-air mixture, e.g., about 1128 degrees Fahrenheit. A safety margin is, of course, provided before the flash point/auto-ignition temperature is reached.

The apparatus 10 also includes a radio 56 and an antenna 58 (see FIG. 5) mounted in the housing 12 for transmitting the displayed indicators to a remote station. The radio 56 may operate in accordance with the Bluetooth (trademark) standard to convey and share the data generated by the apparatus to an incident commander at the remote station. The incident commander can thus track such key information as heat levels detected by the firefighters, orientation of the firefighters (standing or crawling), and hazard warnings detected by the sensors to better react and control the developing fire scene. If the firefighter stops moving for a predetermined period of time as determined by the accelerometer 38, then the radio 56 can be set to automatically transmit a "man-down" alert signal to the incident commander. A battery 60 is also mounted in the housing 12 to supply power to all the electrical components therein. A low battery alert indicator 61 on the display 30 indicates when the battery 60 needs to be replaced. A control knob 62 is turnable to brighten or dim the display 30.

Figure 10:
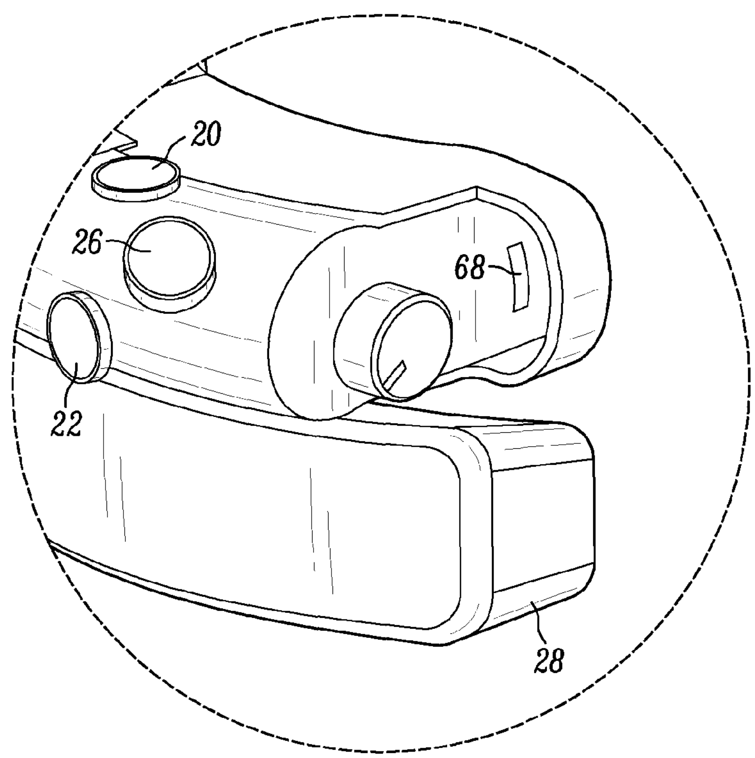
FIG. 10 is a broken-away, perspective view of the circled area in FIG. 8.
Figure 11:
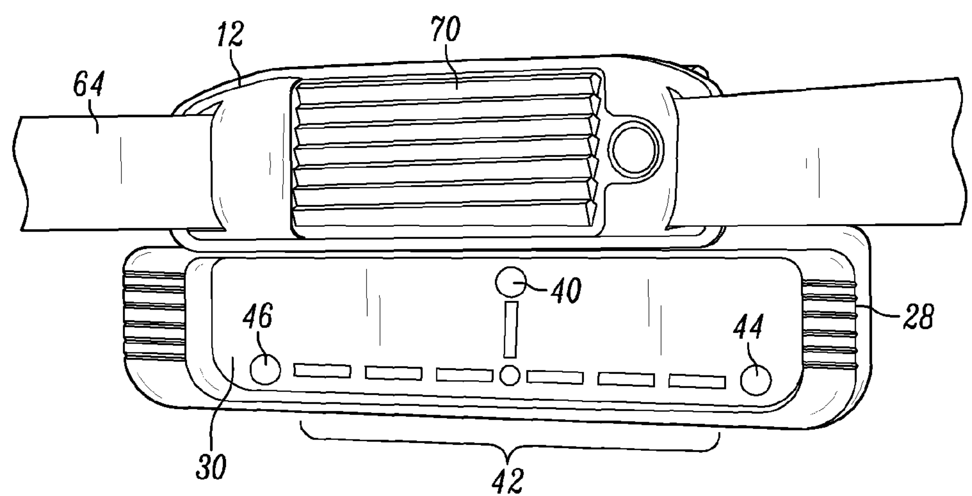
FIG. 11 is a broken-away, rear perspective view of the embodiment of the wearable safety apparatus of FIG. 8 in isolation.

FIGS. 8-11 depict a practical realization of the apparatus 20 and, hence, like reference numerals have been employed to identify like parts. A belt 64 or strap is employed for securing the housing 12 around the crown 18 of the helmet 16. The belt 64 is pivotably mounted on the helmet 16 at pivots 66 to move the housing 12 away from the front brim 14 when not in use. FIG. 10 depicts one of two slots 68 in the housing 12. The belt 64 is routed through the slots 68. Instead of the belt, the housing 12 can be bolted to the brim 14, or can be mounted on a rail or a bracket. FIG. 11 depicts an openable door 70 at the back of the housing 12 to enable replacement of the battery 60. A grip patch is mounted on the exterior of the door 70 to frictionally grab the crown 18 and secure the apparatus 10 on the helmet.

FIG. 11 also depicts a different arrangement for the indicators on the display 30. Thus, the indicators 40, 44, and 46 need not be triangles as shown in FIG. 7, but could be circular spots. Also, the indicator 42 need not be a horizontal row of circular spots that serves as a main thermal location bar as shown in FIG. 7, but could be a horizontal row of linear elements. Each such spot or linear element on the main thermal location bar represents a segmented portion or subfield of the forward thermal zone.

Figure 12:
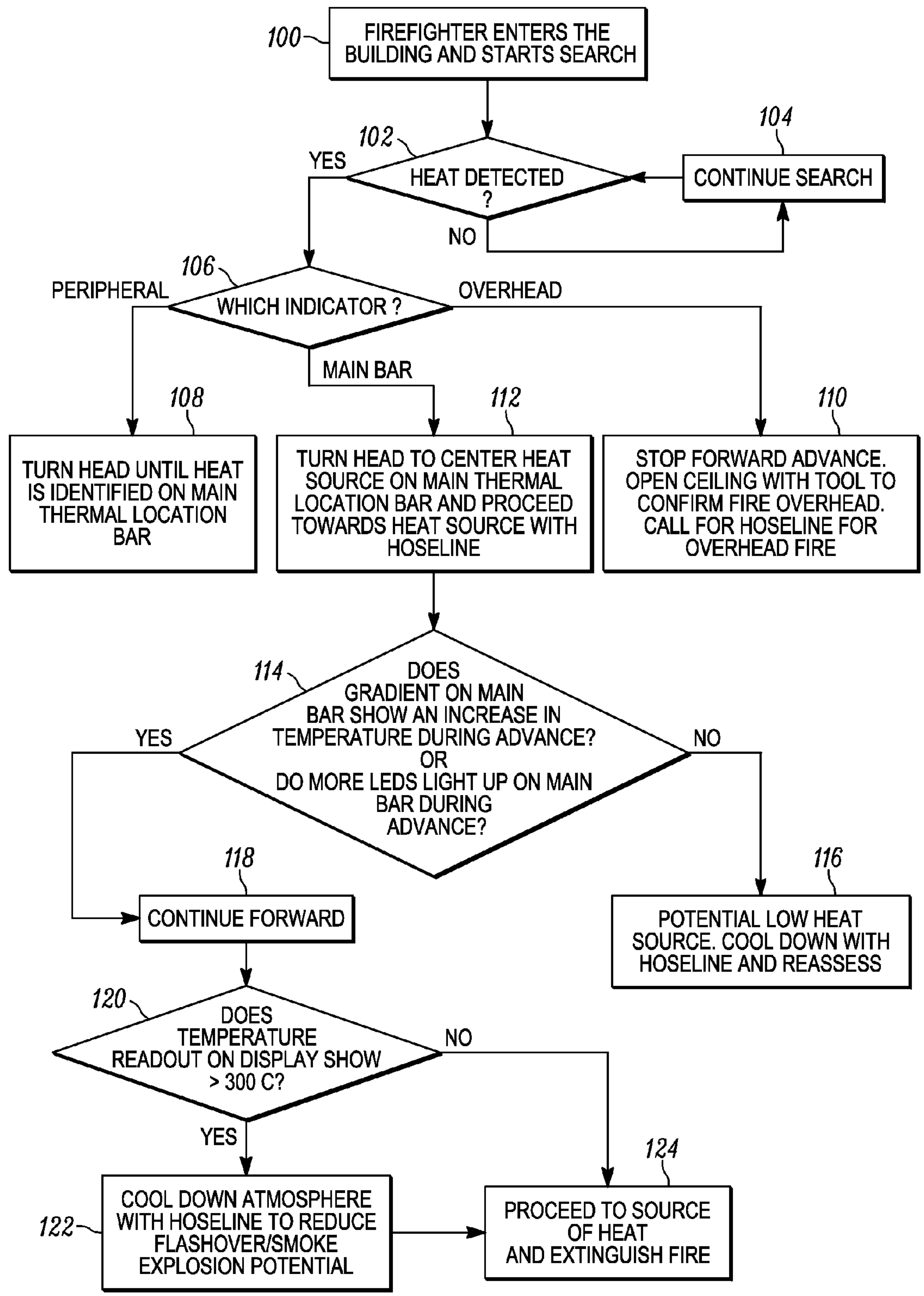
FIG. 12 is a flow chart depicting steps performed during operation of the wearable safety apparatus of FIG. 1 or FIG. 8.

FIG. 12 is a flow chart that depicts how the apparatus 10 is typically used. In step 100, the firefighter wearing the safety apparatus 10 enters a burning structure and begins a search for the source of the fire. If no heat or elevated temperature is detected by referring to the display 30 in step 102, then the search continues in step 104. Once heat is detected in step 106, the firefighter looks at the display 30 to see which of the indicators has been illuminated. If a peripheral indicator 44, 46 has been illuminated, then the firefighter turns his/her head until the main thermal location bar or indicator 42 registers the heat in step 108. If the overhead indicator 40 has been illuminated, then the firefighter stops advancing, opens the ceiling, and calls for a hoseline to extinguish the overhead fire with water in step 110. If the forward indicator 42 has been illuminated, then the firefighter turns his/her head to center the heat source on the main thermal location bar, and proceeds towards the heat source with the hoseline in step 112.

The firefighter then advances in step 114, and sees whether the gradient on the main thermal location bar increases in temperature, or whether more of the light-emitting diodes are illuminated. If not, then the heat source is potentially a low fire, which is cooled down by water, after which the firefighter reassesses the scene in step 118. If so, then the firefighter continues to advance in step 118. If the readout on the display 30 shows that the ambient temperature is above 300 degrees Centigrade in step 120, then the firefighter cools down the atmosphere with the hoseline to reduce the likelihood of conditions leading to a flashover or smoke explosion from developing in step 122. If the ambient temperature is below 300 degrees Centigrade, then the firefighter proceeds to the heat source and extinguishes the fire in step 124.

In the foregoing specification, specific embodiments have been described. However, one of ordinary skill in the art appreciates that various modifications and changes can be made without departing from the scope of the invention as set forth in the claims below. For example, rather than mounting the apparatus 10 with the aid of the belt 64 on the helmet, it is also contemplated that the apparatus can be built into, and integrated with, the helmet. Also, a rear thermal sensor could be positioned to face rearwardly of the housing 12, to thereby also detect the temperature rearwardly of the firefighter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A wearable safety apparatus, comprising:

a housing;

a plurality of directional thermal imaging sensors mounted on the housing and generally facing outwardly away from the housing in a corresponding plurality of different directions towards thermal zones of a heat source, each sensor being operative for detecting infrared radiation (IR) intensity and for generating an output indicative of a temperature of the detected IR intensity in a respective thermal zone generally faced by a respective sensor;

an ambient thermal imaging sensor mounted on the housing for detecting an ambient temperature for the apparatus;

a gas detector mounted on the housing for detecting a gas and a concentration of the gas; and a controller for processing the outputs generated by the directional thermal imaging sensors, the ambient temperature generated by the ambient thermal imaging sensor, and the gas and concentration detected by the detector to determine conditions leading to a flashover are present, and for indicating such flashover conditions responsive to the determination that the conditions leading to the flashover are present.

2. The wearable safety apparatus of claim 1, wherein the housing has an upright orientation; and wherein the sensors include a top sensor facing generally upwardly in the upright orientation, a forward sensor facing generally forwardly in the upright orientation, a right peripheral sensor facing generally rightwardly, upwardly, and forwardly in the upright orientation, and a left peripheral sensor facing generally leftwardly, upwardly, and forwardly in the upright orientation.

3. The wearable safety apparatus of claim 1, wherein the sensors have respective relatively wide fields of view that overlap at a predetermined distance away from the housing.

4. The wearable safety apparatus of claim 1; and a radio mounted in the housing for transmitting the displayed indicators to a remote station.

5. The wearable safety apparatus of claim 1, wherein the controller determining that conditions leading to a flashover are present comprise identifying a lowest flash point of one of a plurality of gases detected by the gas detector, and detecting that one of the outputs generated by the directional thermal imaging sensors and the ambient temperature generated by the ambient thermal imaging sensor indicates a temperature approaching the lowest flash point.

6. The wearable safety apparatus of claim 1, wherein the controller determining that conditions leading to a flashover are present comprise identifying a lowest auto-ignition temperature for a gas-air mixture for the one of the plurality of gases detected by the gas detector, and detecting that one of the outputs generated by the directional thermal imaging sensors and the ambient temperature generated by the ambient thermal imaging sensor indicates a temperature approaching the lowest auto-ignition temperature.

7. The wearable safety apparatus of claim 1, wherein the controller determining that conditions leading to a flashover are present comprise identifying a lowest of a flash point of one of a plurality of gases detected by the gas detector and an auto-ignition temperature for a gas-air mixture for the one of the plurality of gases detected by the gas detector, and detecting that one of the outputs generated by the directional thermal imaging sensors and the ambient temperature generated by the ambient thermal imaging sensor indicates a temperature approaching the lowest of the flash point and the auto-ignition temperature.

8. A safety method, comprising:

wearing a housing in a hands-free manner;

mounting a plurality of directional thermal imaging sensors on the housing;

generally facing the sensors outwardly away from the housing in a corresponding plurality of different directions towards thermal zones of a heat source, each sensor being operative for detecting infrared radiation (IR) intensity and for generating an output indicative of a temperature of the detected IR intensity in a respective thermal zone faced by a respective sensor;

mounting an ambient thermal imaging sensor on the housing for detecting an ambient temperature for the apparatus;

mounting a gas detector on the housing for detecting a gas and a concentration of the gas;

processing, by a controller, the outputs generated by the directional thermal imaging sensors, the ambient temperature generated by the ambient thermal imaging sensor, and the gas and concentration detected by the detector to determine conditions leading to a flashover are present; and providing an electronic indication indicating such flashover conditions responsive to the determination that the conditions leading to the flashover are present.

9. The safety method of claim 8, wherein the housing is mounted on a helmet worn on a user's head, and wherein a user turns his/her head to locate the direction of the heat source.

10. The safety method of claim 8, wherein the processing, by the controller, to determine conditions leading to a flashover are present comprises identifying a lowest flash point of one of a plurality of gases detected by the gas detector, and detecting that one of the outputs generated by the directional thermal imaging sensors and the ambient temperature generated by the ambient thermal imaging sensor indicates a temperature approaching the lowest flash point.

11. The safety method of claim 8, wherein the processing, by the controller, to determine conditions leading to a flashover are present comprises identifying a lowest auto-ignition temperature for a gas-air mixture for the one of the plurality of gases detected by the gas detector, and detecting that one of the outputs generated by the directional thermal imaging sensors and the ambient temperature generated by the ambient thermal imaging sensor indicates a temperature approaching the lowest auto-ignition temperature.

12. The safety method of claim 8, wherein the processing, by the controller, to determine conditions leading to a flashover are present comprises identifying a lowest of a flash point of one of a plurality of gases detected by the gas detector and an auto-ignition temperature for a gas-air mixture for the one of the plurality of gases detected by the gas detector, and detecting that one of the outputs generated by the directional thermal imaging sensors and the ambient temperature generated by the ambient thermal imaging sensor indicates a temperature approaching the lowest of the flash point and the auto-ignition temperature.

* * * * *